US007191665B2

(12) United States Patent
Saunders et al.

(10) Patent No.: US 7,191,665 B2
(45) Date of Patent: Mar. 20, 2007

(54) SUPPORT FOR A REFLECTIVE TARGET

(75) Inventors: Duncan Saunders, Ennetbaden (CH); Kurt Faller, Brugg (CH); Gustav Hagstroem, Nussbaumen (CH); Ernst Vogt, Remigen (CH)

(73) Assignee: Alstom Technology Ltd., Baden (CH)

(*) Notice: Subject to any disclaimer, the term of this patent is extended or adjusted under 35 U.S.C. 154(b) by 160 days.

(21) Appl. No.: 10/874,162

(22) Filed: Jun. 24, 2004

(65) Prior Publication Data

US 2004/0262469 A1 Dec. 30, 2004

(30) Foreign Application Priority Data

Jun. 26, 2003 (EP) ................................ 03405466

(51) Int. Cl.
*G01N 3/02* (2006.01)

(52) U.S. Cl. ........................................ 73/856

(58) Field of Classification Search .................. 73/856, 73/655

See application file for complete search history.

(56) References Cited

U.S. PATENT DOCUMENTS

| | | | | |
|---|---|---|---|---|
| 2,650,753 | A * | 9/1953 | Howard et al. | 415/137 |
| 2,869,941 | A * | 1/1959 | Shoup, Jr. et al. | 384/581 |
| 3,027,717 | A * | 4/1962 | Conklin et al. | 60/757 |
| 3,118,278 | A * | 1/1964 | Hill | 60/804 |
| 5,349,850 | A | 9/1994 | Young | |
| 5,612,497 | A * | 3/1997 | Walter et al. | 73/756 |
| 5,867,977 | A | 2/1999 | Zachary et al. | |
| 6,037,581 | A * | 3/2000 | Zorner | 250/231.13 |
| 6,336,789 | B1 | 1/2002 | Beerens et al. | |
| 6,571,560 | B2 * | 6/2003 | Tatsumi et al. | 60/753 |
| 6,868,366 | B1 * | 3/2005 | Eisenzopf | 702/182 |

FOREIGN PATENT DOCUMENTS

| | | |
|---|---|---|
| DE | 196 01 225 C1 | 6/1997 |
| EP | 0 558 843 A1 | 9/1993 |
| EP | 10267607 | 10/1998 |
| GB | 1080726 | 8/1967 |
| SU | 1262271 A1 | 10/1986 |
| WO | 93/17296 | 9/1993 |

OTHER PUBLICATIONS

Search Report from EP 03 40 5466 (Nov. 10, 2003).

* cited by examiner

*Primary Examiner*—Michael Cygan
*Assistant Examiner*—O. Davis
(74) *Attorney, Agent, or Firm*—Cermak & Kenealy, LLP; Adam J. Cermak

(57) ABSTRACT

A support (1) for a reflective target to be mounted on a turbine casing, which is used in casing bending measurements. The support (1) comprises a tube (2), which was chosen to ensure a thermal expansion coefficient near zero at the operating temperatures of the casing. The tube (2) is located at one end in a steel holder (3). In the middle of the tube (2) is arranged a metal rod (9), which is fixed to the holder (3). At the opposite end of the tube (2) is an insert (7), which has an apertures through which passes the metal rod (9). Within the insert (7) the metal rod (9) is screw threaded so it can be turned to provide always enough tension at all operating temperatures and the metal tube (9) is held tight, secure, and has minimal vibration.

10 Claims, 2 Drawing Sheets

SUPPORT FOR A REFLECTIVE TARGET

This application claims priority under 35 U.S.C. § 119 to EP application no. 03405466.8, filed 26 Jun. 2003, the entirety of which is incorporated by reference herein.

BACKGROUND OF THE INVENTION

1. Field of the Invention

The invention relates to a support for a reflective target used in turbine casing bending measurements.

2. Brief Description of the Related Art

The assessment of clearance conditions in an operating turbine structure has proved difficult to achieve. Therefore WO 93/17296 provides apparatus which enables the clearance between seal fins on rotating blades and adjacent fixed structure, to be observed during rotation, and comprises refracting prisms on the fixed structure arranged so as to straddle sealing fin on the blades. The stage of blades on their associated disc are moved towards the fixed structure and light which is refracted through the prisms is attenuated by the fins. In one embodiment, the ratio of attenuated to unattenuated light intensity is utilized to generate electrical signals, which are then manipulated so as to indicate the magnitude of the clearance.

GB-A-1 080 726 discloses a method of testing the clearances between the tips of the blades of a bladed rotor and a casing within which the rotor is mounted, said method comprising directing light towards the region between the said tips and the casing in such a way that, as the rotor is rotated, at least part of the light periodically strikes the said tips so as to be affected by the radial positions of the latter, and employing the light which has been so affected to provide information concerning the sizes of the said clearances.

In DE-C1-196 01 225 a radial gap produced between the turbine housing and the turbine shaft or between the turbine housing and a turbine blade is monitored when a turbine is running. According to the invention, in order to ensure that the radial gap is measured constantly and accurately, a measuring reference point of non-oxidizing material is disposed on at least one turbine blade and/or on the surface of the turbine shaft in order to reflect light from a glass fibre probe which is guided through the turbine housing.

On the other hand other publications disclose different forms of the casing to avoid deformation. For example U.S. Pat. No. B1-6,336,789 discloses a casing for a steam or gas turbine comprises a shell and two flanges. The wall thickness of the shell is varied in an upper region facing away from the flange, in two central regions and in two lower regions facing the flanges, such that the upper region facing away from the flanges is reinforced in comparison with the lower regions facing the flanges. The lower regions facing the flanges are more flexible than the flanges which are attached by screws, and the partially reinforced central region and the reinforced upper region, and act as a joint to compensate for deformation, particularly in the radial direction. Consequently, the casing remains considerably more round in operation. The reduced radial clearance (achieved by reduced deformation) between the casing and the ends of the turbine blades leads to considerably increased efficiency during operation of the turbine At the same time the surveillance can be done from the outside of the turbine casing. At this point the invention comes into action.

SUMMARY OF THE INVENTION

The support according to the invention comprises a quartz glass tube. This material was chosen to ensure a thermal expansion coefficient of zero or near zero in the operating temperature range of the flange of the turbine casing. In that way the glass tube has no or only slight expansion and the movement of the tube represents the movement of the casing itself.

The tube is located at one end in a steel holder. On one end of the holder is on a projection a thread. This thread is used to screw the assembly to the turbine casing. At the opposite end of the glass tube is a “top hat” insert arrangement, which is located in the inner diameter of the glass tube. The reflective target is connected to the outer end of the “top hat” insert. The end of the metal rod located inside the insert is screw threaded and secured by a nut. This nut can be turned to provide varying tensions of the metal rod in the assembly. This can be “tuned” so that there is always enough tension at all operating temperatures so that the target is held tight, secure, and has minimal vibration.

Near the top of the bore of the holder is a recess that holds a spring. This spring acts to hold the glass tube centrally and can accommodate any thermal expansion of the holder.

Surrounding the outside of the hexagonal holder is a hexagonal tube. This tube is welded to the base of the holder. This hexagonal tube extends at least to the half of the length of the glass tube. This prevents any accidental damage to the glass tube when attached to the engine. It also enables a spanner to be used to secure the assembly to the turbine flange.

BRIEF DESCRIPTION OF THE DRAWINGS

An exemplary embodiment of the invention is illustrated in the accompanying drawing, in which.

Figure 1:
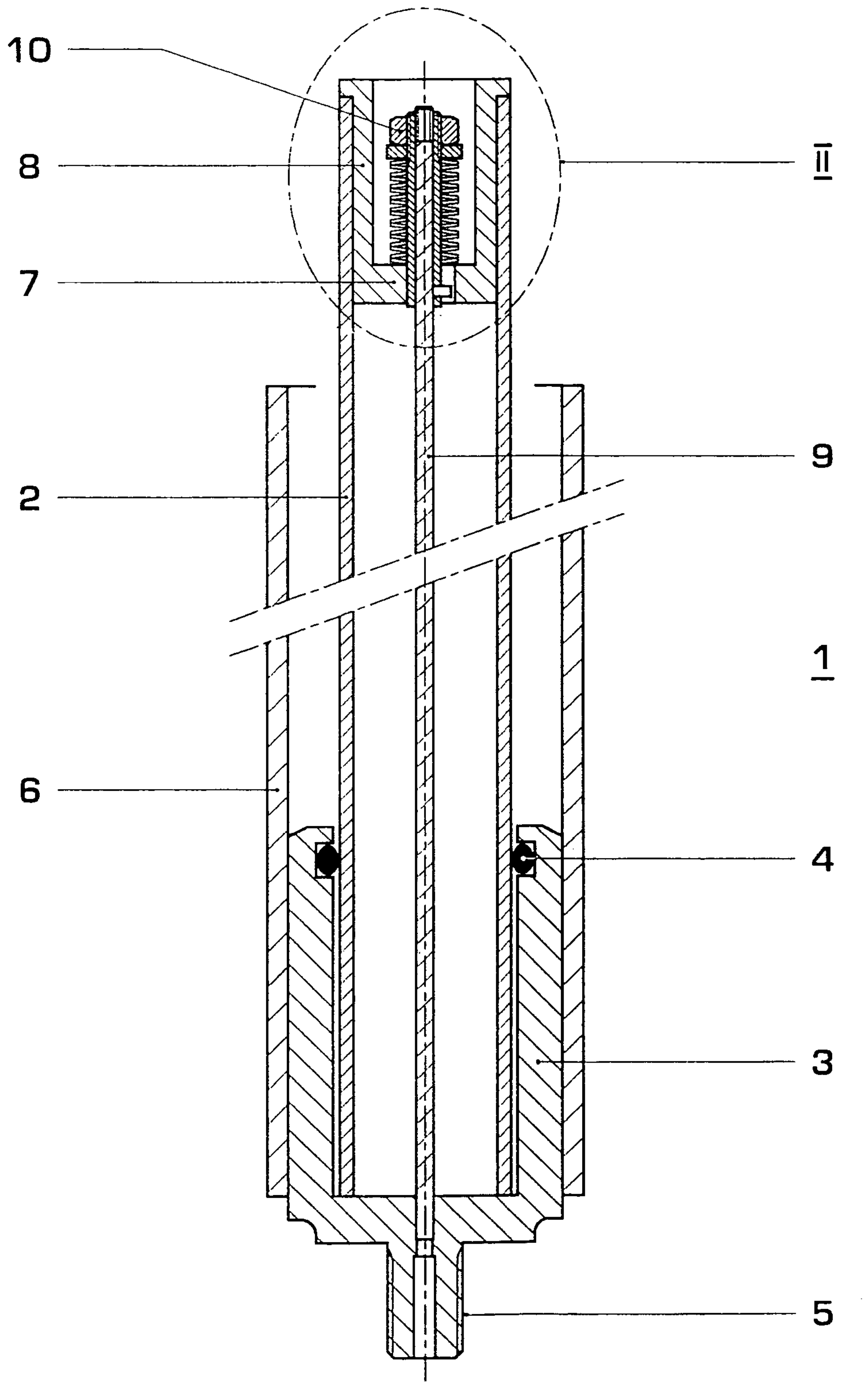
FIG. 1 shows a cut-through of an inventive target support is shown and FIG. 2 illustrates a “top hat” arrangement according to the circle II in FIG. 1

The drawings show only the parts important for the invention.

DETAILED DESCRIPTION OF THE PREFERRED EMBODIMENTS

The present invention is related to a support 1 for reflective targets, not shown in the drawing, the support 1 mounted on the outside of a casing of a thermal turbo machine. The turbine can be e.g. a gas turbine, a steam turbine or a compressor. With time the movements of these reflective targets shown in the photographs, can be compared with each other, and so the casing movement can be calculated and compared to the other running condition measurements at that time.

The used measurement is based on a photography photogrammetry technique. Timing of photographs will be coordinated with engine running time. Photogrammetry is a technique for 3-dimensional co-ordinate measurement that is based on the principle of triangulation. By taking pictures from at least two different locations and measuring the points of interest in each photograph, one can develop lines of sight from each camera location to the points of interest on the object. The intersection of these pairs of lines of sight can then be triangulated to produce the 3-dimensional co-ordinate of the point on the object. In this way, a pair of two-dimensional measurements of the x,y positions of the point in each photograph are used to produce the single X,Y,Z co-ordinate measurement of the point on the object.

Measurement is not limited to a single point. There is no limit in theory to the number of points that can be triangulated. A typical measurement may involve as few as a dozen points to as many as several thousand.

Basically, there are two methods of photogrammetry. Typically, they are called stereo photogrammetry and convergent photogrammetry. Using convergent photogrammetry, photographs are taken with the camera axes typically inclined towards each other (rather than parallel to each other as with the stereo method) so that the camera axes converge or intersect. One now measures easily identified features in each photograph, and these measurements are combined together to produce the 3-dimensional co-ordinates of the points. In order to achieve a high degree of automation, reliability and accuracy in the measuring process, one normally measures high-contrast targets placed on or near the points of interest on the object. Although features such as hole centres, edges, bolt heads, etc. can and can be measured, the photographic process is more difficult, and the measuring process is slower, less accurate and far less automated than when targets are used. For this reason the present invention intend using targets. Unlike the similar stereo method, the convergent method is not limited to using just two photographs of an object at a time. Many photographs can be taken which leads to higher accuracy and reliability and makes it far easier to measure complex objects which can not be completely seen in just two photographs. It is expected that the accuracy should be in the region of +/−0.1 mm or even better.

The Figure shows an exemplary support 1. Possible mounting points on the turbine casing to measure are on the horizontal split line flange (not shown in the FIG. 1). The support 1 comprises a quartz glass tube 2. This material was chosen to ensure a thermal expansion coefficient (CTE) of zero or close to zero in the operating temperature range of the flange of the turbine casing. In that way the glass tube 2 has no or only slight expansion and the movement of the tube 2 is only the movement of the casing itself. The tube 2 is located at one end in a steel holder 3. This holder 3 is circular on the inside to fit the tube 2 and hexagonal on the outside. There is a clearance between the glass tube 2 and the round bore of the holder 3. Near the top of the bore of the holder 3 is a recess that holds a spring 4. This spring 4 acts to hold the glass tube 2 centrally, but can accommodate any thermal expansion of the holder 3. The other end of the holder 3 has a closed end, and on this closed end is on projection a thread 5. This thread 5 is used to screw the assembly to the turbine casing.

Surrounding the outside of the hexagonal holder 3 is a hexagonal tube 6. This tube 6 is welded to the base of the holder 3. This hexagonal tube 6 extends at least to the half of the length of the glass tube 2. This prevents any accidental damage to the glass tube 2 when attached to the engine. It also enables a spanner to be used to secure the assembly to the turbine flange.

At the opposite end of the glass tube 2 is an insert 7, a top hat that fits inside the tube 2 and has a step to locate on the end of the glass tube 2. The insert 7 has an aperture 8 at the end innermost into the glass tube 2. Through this aperture 8 passes a metal rod 9. The metal rod 9 passes down the middle of the glass tube 2, and is connected to the base of the holder 3. This end of the holder 3 is thin enough so as to provide minimal thermal expansion from the surface of the flange of the casing to the base of the metal rod 9.

At the opposite end of the glass tube 2 is a "top hat" insert 7 arrangement, which is located in the inner diameter of the glass tube 2. The reflective target is connected to the outer end of the "top hat" insert 7. The end of the metal rod 9 is screw threaded and secured by a nut 10, and is located inside the insert 7. This nut 10 can be turned to provide varying tensions of the metal rod 9 in the assembly. This can be "tuned" so that there is always enough tension in the metal rod 9 at all operating temperatures so that the metal rod 9 is held tight, secure, and has minimal vibration.

Figure 2:
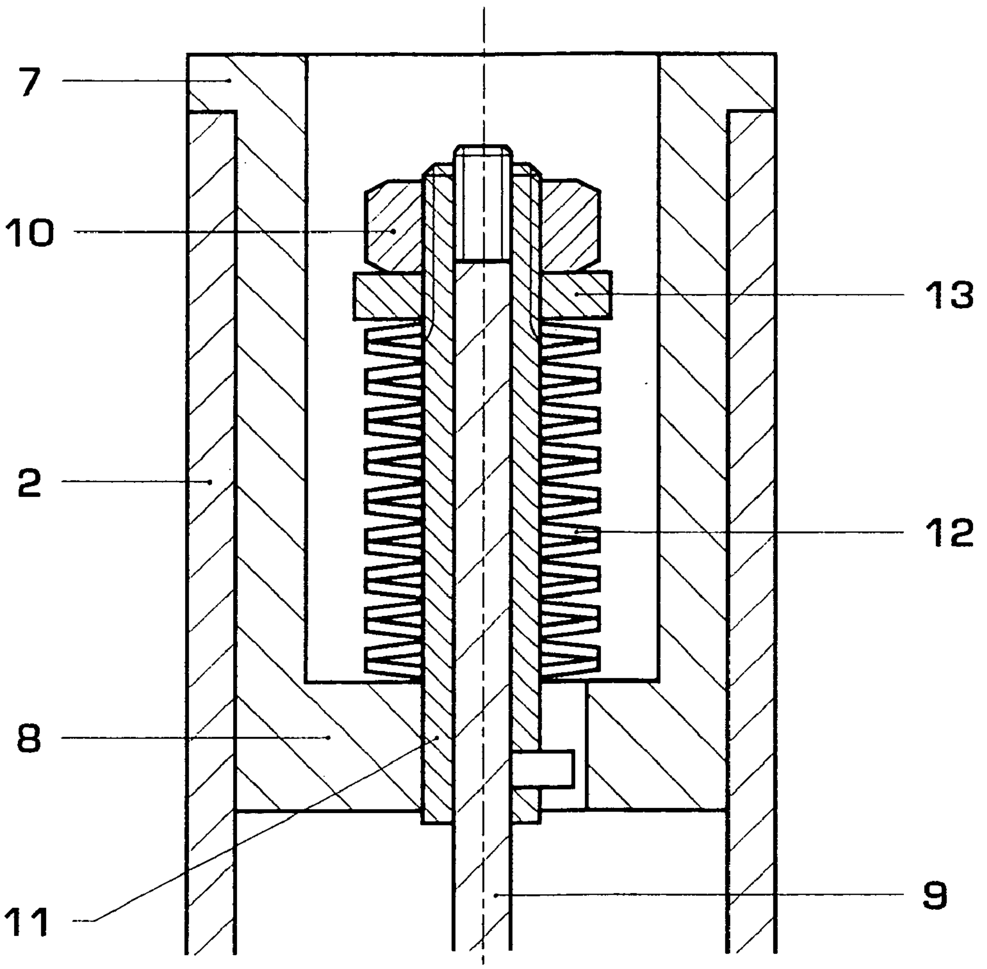

FIG. 2 shown in detail the "top hat" insert 7 arrangement according to the circle II in FIG. 1. The "top hat" insert 7 arrangement comprises a bush 11. The bush 11 is at one end of the rod 9, within the top hat assembly 7 with a clearance fit. The rod 9 may be held inside the bush 11 by being spot welding or is fixed in any other way at the tip of the rod 9. The bush 11 is fixed by any means as well within the aperture 8. A spring 12 encloses the bush 11, and has one end in contact with the inner end of the "top hat" insert 7. At the other end of the spring is a washer 13. The nut 10 is secured to the treaded end of the bush 11, compressing the spring 12 through the washer 13 when the assembly is assembled.

REFERENCE NUMBERS

1 Device, Support
2 Quartz glass tube
3 Holder
4 Spring
5 Thread
6 Tube
7 Insert
8 Aperture
9 Metal rod
10 Nut
11 Bush
12 Spring
13 Washer While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A support for a reflective target to be mounted on the outside of a casing of a turbine, the support useful in turbine casing bending measurements, comprising:

a tube comprising a material with a thermal expansion coefficient (CTE) of about zero in the operating temperature range of turbine casing, the tube having a first end, a second end, and a middle;

a holder arranged around the first end of the tube, the holder comprising a first end and means for fixing the holder to the turbine casing;

a metal rod arranged in the middle of the tube, the metal rod having a first end fixed to the first end of the holder, and having a second end;

an insert having an aperture and arranged within the second end of the tube, the metal rod passing through the aperture of the insert; and means for fixing and tensioning of the metal rod on the second end of the metal rod within the insert.

2. The support according to claim 1, wherein the tube comprises a quartz glass tube.

3. The support according to claim 1, further comprising:

a recess; and a spring between the holder and the tube in the recess.

4. The support according to claim 1, wherein the holder has a circular inside and a hexagonal outside.

5. The support according to claim 1, further comprising:

an outer tube positioned around the holder.

6. The support according to claim 5, wherein the outer tube is welded to the first end of the holder.

7. The support according to claim 5, wherein the outer tube extends at least over half of the length of the holder or of the metal rod.

8. The support according to claim 1, wherein the holder has a projection including a thread to fix the support on the turbine casing.

9. The support according to claim 1, wherein the means for fixing and tensioning of the metal rod comprises a nut.

10. The support according claim 9, wherein the means for fixing and tensioning of the metal rod comprises:

a bush arranged around the metal rod and fixed at the second end of the metal rod and within the aperture;

a spring arranged around the bush;

a washer arranged above the spring and around the bush; and wherein the nut is threaded to the bush.

* * * * *